Sept. 27, 1966   J. FORSTER   3,274,846
FLEXIBLE CABLE
Filed June 2, 1964
FIG. 1.
FIG. 2.
FIG. 3.
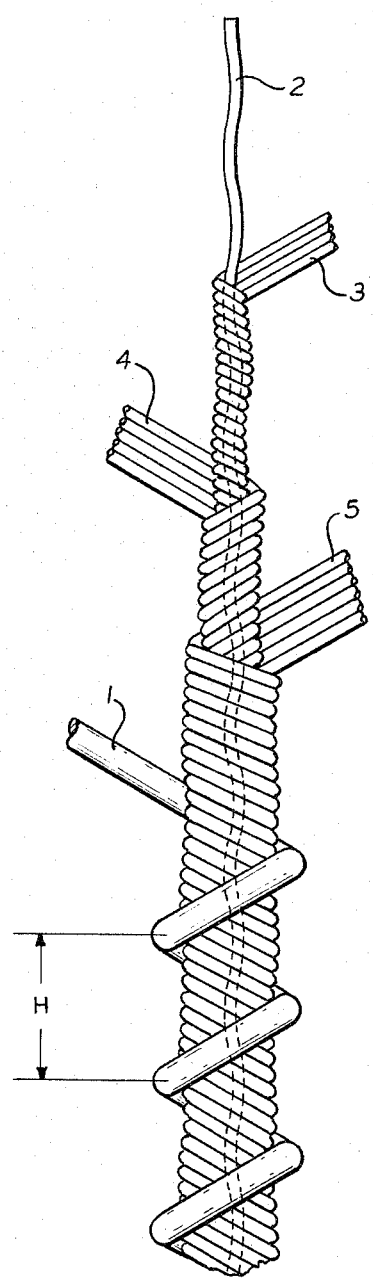
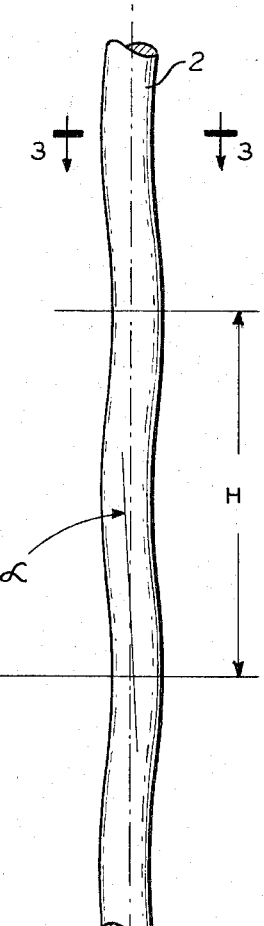
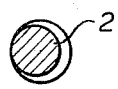
INVENTOR
JOHANN FÖRSTER
BY
*Ernest J. Montague*
ATTORNEY.

United States Patent Office 3,274,846
Patented Sept. 27, 1966

3,274,846
FLEXIBLE CABLE
Johann Forster, Frankfurt am Main, Germany, assignor of one-half to VDO Tachometer Werke Adolf Schindling G.m.b.H., Frankfurt am Main, Germany, and one-half to Firma Golde & Co. G.m.b.H., Frankfurt am Main, Germany, both corporations of Germany
Filed June 2, 1964, Ser. No. 371,966
Claims priority, application Germany, June 7, 1963, V 24,146
4 Claims. (Cl. 74—422)

The present invention relates to a flexible cable in general, and to such flexible cable for the transmission of tension forces and pressure forces, respectively, in axial direction of the cable with a helical running winding which engages a toothed gear. The flexible cable comprises a wire-shaped core and a plurality of layers of wire windings wound over the core in opposite directions, on which wire windings the running winding is mounted under tension.

Such cables are used for the mechanical remote operation of flaps, closures, windows, and the like. They are disposed, for this purpose, in guides, which can be curved according to the flexibility of the cable. As to their function, such cables amount to a flexible gear rack, which is displaced by a gear in the guides and, thereby, transmits the tension-forces or pressure-forces required for the intended remote operation. The dimension of the cable as well as of the gear is dependent upon the size of the forces to be transmitted. The size of the teeth of the toothed gear determines at first the strength of the running winding, which comprises in its simplest form a helical round wire wound over the flexible core of the cable. It results then from the strength of this running winding, within certain limits, the winding diameter of the helical running winding. The core and the layers of wire windings wound thereover, for transmission of the tension- and pressure-forces, respectively, are disposed within this helical running winding. The latter is wound under high pre-tension over the flexible core of the cable, so that the running winding retains together the different layers of wire windings and has such holding power upon the core, that it cannot be displaced on the latter during the transmission of forces.

In the known flexible cables of this type, the core, which can comprise either a smooth wire or a wire rope, and also, as a rule, a layer of wires wound at a large angle of inclination, which wires suitably form the outermost layer of the wire windings, serves the purpose of transmitting the tension forces. The layers of wire windings disposed between the core and the outermost layer of wire windings, transmitting the tension forces, which wire windings are wound at an appreciably smaller angle of inclination and which also contribute to the determination of the flexibility of the cable, serve the purpose of transmitting the pressure forces.

This known structure of such flexible cables has a number of drawbacks, particularly concerning their manufacture. The use of a smooth core or of a smooth wire rope results in a cylindrical envelope covering the further layers of wire windings. The cylindrical arrangement of the layers including the running winding requires a very great pretension of the wires during the winding for the purpose of obtaining the holding forces of the individual layers on top of each other necessary for the transmission of forces and the corresponding apparatus. While the holding force for the narrow wound intermediate layers can be obtained comparatively well, the obtaining of the necessary holding force for the running winding wound spaced apart is appreciably more difficult.

It is possible, therefore, to use only a relatively soft wire material, for instance, soft iron, for the uppermost intermediate layer, and it has been also proposed before to wind the running winding with such great pre-tension, that the outermost intermediate layer is deformed at the engaging points with the running winding. This contradicts, however, the use of this layer as a tension transmitting layer, for which it would be of advantage, to use a wire material with possibly high tensile strength, for instance, hardened steel wire. Such high pre-tension during winding of the running winding can cause also an irregular bending of the cable, so that the envelope of the running winding is no more cylindric. A further appreciable drawback during the manufacture of the known flexible cable resides in the fact, that the tension transmitting and very steeply wound layer and the pressure transmitting layer wound with an appreciably lower angle of inclination cannot be produced in one working step, since completely different devices are required for the steep laying of the wires for the tension transmitting layer, than for the production of the pressure transmitting layers having a small angle of inclination. For the production of pressure transmitting windings, of the tension transmitting winding and of the running winding thus three working steps are required.

It has also been proposed before, to twist two round wires or a section wire, to use these twisted wires instead of conventional round wires for the production of such cable and, thereby, to increase the holding friction between the wires layers relative to each other and between the running winding and the core of the cable. This arrangement is, however, very expensive and the engaging face for the running winding remains practically a cylindrical face.

It is, therefore, one object of the present invention to provide a flexible cable, which avoids the drawbacks of the known cables and simplifies and reduces the costs for manufacturing of such cables.

It is another object of the present invention to provide a flexible cable, which provides furthermore a safety against axial displacement of the layers and requires, during winding, no particularly high pretension of the wires.

It is yet another object of the present invention to provide a flexible cable, wherein the core comprises a wire of high tensile strength, which is wound helically with its longitudinal axis with the pitch of the running winding and with a very great angle of inclination. Advantageously and in its simplest manner, the core comprises a round wire of a diameter larger than one third of the diameter of the wire-shaped running winding, which is formed helically with an angle of inclination of about 80°–85°. Due to the selection of a relatively strong core of the cable, the latter can assume the main portion of the tension force transmission. Between the core and the running winding are disposed as intermediate layers about the core no more than three layers of wire windings wound in opposite directions and consisting of at least three and no more than six parallel equally strong wires for the transmission of the pressure forces. The production of such flexible cables and the maintenance of stocks thereof can be simplified in such manner, that the intermediate layers wound about the core comprise wires of equal diameter.

It is still a further object of the present invention to provide a flexible cable, wherein by the use of a relatively strong wire core of high tensile strength, a steeply laid intermediate layer for the transmission of the pressure forces can be omitted and the entire cable can be produced in one single working step, whereby the individual layers are wound one after the other about the core. The core forms a completely flat screw winding. This flat screw winding with a pitch equal to the pitch of the running winding transfers itself to the intermediate layers and the running winding is wound therein. The flat waving of the intermediate layers prevents a displacement on the core, as well as of the intermediate layers relative to each other, and of the running winding on the outermost intermediate layer. The individual windings of the running winding are maintained at the correct distance from the core of the cable and no particularly high pre-tension is required for its laying.

With these and other objects in view, which will become apparent in the following detailed description, the present invention will be clearly understood in connection with the accompanying drawing, in which:

FIGURE 1 is an elevation of the flexible cable, designed in accordance with the present invention, shown at an enlarged scale and partly unwound, for the purpose of better demonstration of the present invention;

FIG. 2 is an elevation of the core, shown at an enlarged scale; and

FIG. 3 is a section along the lines 3—3 of FIG. 2.

Referring now to the drawing, the flexible cable comprises a helical running winding 1 having a pitch H and a core consisting of a helically wound wire 2 of great tensile strength and having a very large angle of inclination α of about 80°–85°. The wire 2 is so steeply pitched and so weakly helically wound, that the diameter of the cylindrical envelope of the screw winding, as shown in section in FIG. 3, is only a proportion larger than the diameter of the wire 2, so that a continuous cylindrical core remains shown in dotted lines in FIG. 3. This flat screw winding can only be stretched to a straight line by means of a tension force, which is close to the yield point of the working material. Such large tension forces can never occur, however, in connection with the provided purpose of use. They would rather first destroy the toothed gear (not shown) or the running winding 1.

The flat waving of the screw winding transmits itself to the intermediate windings 3, 4 and 5 wound over the core wire 2. The winding 3 comprises, in the example shown in the drawing, four, the winding 4 of five and the winding 5 of six parallel wires. The running winding 1 is wound about the winding 5 into the flat screw winding and is retained by the latter at the correct distance on the flexible core of the cable.

While I have disclosed one embodiment of the present invention, it is to be understood that this embodiment is given by example only and not in a limiting sense, the scope of the present invention being determined by the objects and the claims.

I claim:
1. A flexible cable for the transmission of tension- and pressure-forces in axial direction of the cable, comprising
   a core,
   a plurality of layers of wire-windings wound about said core in opposite directions,
   an outer running winding wound under tension with a predetermined pitch about said layers of wire windings,
   said core comprising a wire of great tensile strength wound helically along its longitudinal axis with said pitch of said outer running winding and a very large angle of inclination.
2. The flexible cable, as set forth in claim 1, wherein said core comprises a round wire having a diameter larger than one third of the diameter of said running winding, and
   said running winding is helically wound with an angle of inclination in a range of about 80°–85°.
3. The flexible cable, as set forth in claim 1, wherein said plurality of layers of wire windings comprises no more than three layers wound about said core, and
   each of said wire windings comprises at least three and no more than six of parallel equally strong wires.
4. The flexible cable, as set forth in claim 1, wherein said layers of windings are wound in opposite directions relative to each other, and
   said layers of windings have wires of equal diameter.

References Cited by the Examiner
UNITED STATES PATENTS

| | | | |
|---|---|---|---|
| 1,951,723 | 3/1934 | Burd et al. | 74—504 X |
| 1,983,962 | 12/1934 | Barber et al. | 57—145 X |
| 1,990,514 | 2/1935 | Angell | 57—145 |
| 2,875,597 | 3/1959 | Neubauer | 64—2 |
| 3,146,576 | 9/1964 | Wezel | 64—2 X |
| 3,163,054 | 12/1964 | Werner | 74—422 |
| 3,184,986 | 5/1965 | Kompanek et al. | 74—422 |

FRANK J. COHEN, *Primary Examiner.*

D. E. WATKINS, *Assistant Examiner.*